Oct. 17, 1967  I. V. K. HOTT  3,347,342
LIFT INSTALLATION
Filed July 26, 1965
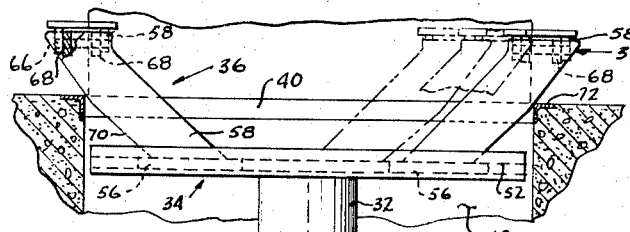
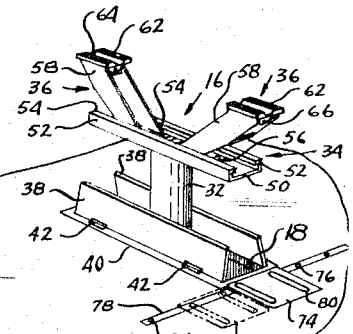
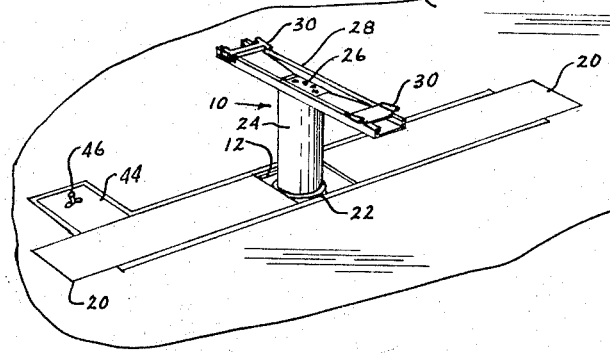
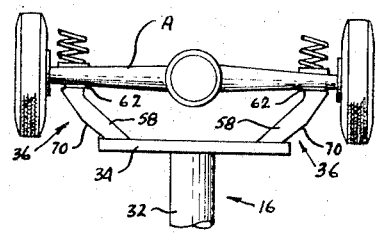
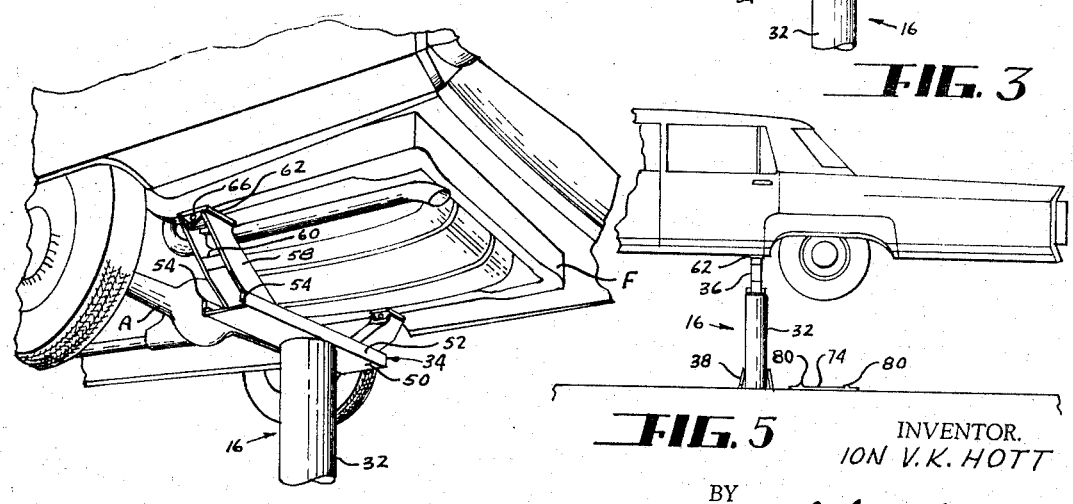
INVENTOR.
ION V. K. HOTT
BY
*Dybvig & Dybvig*
HIS ATTORNEYS … # 3,347,342
LIFT INSTALLATION
Ion V. K. Hott, Dayton, Ohio, assignor to The Joyce-Cridland Company, Dayton, Ohio, a corporation of Ohio
Filed July 26, 1965, Ser. No. 474,819
5 Claims. (Cl. 187—8.41)

This invention relates to a lift installation and more particularly to a vehicle lift installation having at least two jacking units located in spaced pits below ground or floor level. However, as will become apparent from the ensuing description, the invention is not necessarily so limited.

An object of this invention is to provide a vehicle lift installation having a pair of jacking units capable of engaging either frame or axle portions of the underbody of a vehicle. More specifically, an object of this invention is to provide such a vehicle lift installation adapted to engage the rear axle of a vehicle or, alternatively, frame portions of a vehicle either fore or aft of the rear axle.

Another object of this invention is to provide vehicle lifting apparatus including movable vehicle engaging pads which, when not in use, are located in a floor pit and which, when lowered into the floor pit, are automatically movable along their support so as to conveniently fit within the confines of the pit.

Still another object of this invention is to provide a vehicle lift installation incorporating two jacking units, one of which has a pair of laterally slidable vehicle engaging pads adapted to engage either the rear axle or rear frame portions of the vehicle and the other of which has a pair of longitudinally slidable vehicle engaging pads adapted to engage portions of the front suspension system of the vehicle or, alternatively, front frame portions thereof. In this specification and claims, the term "longitudinal" refers to the same direction as the major dimension of a vehicle placed on the vehicle lift installation when the installation is used as intended. The term "lateral" refers to the direction perpendicular to longitudinal and is from one side to the other of a vehicle placed on the lift installation under normal use.

Other objects and advantages reside in the construction of parts, the combination thereof, the method of manufacture and the mode of operation, as will become more apparent from the following description.

Referring to the drawings:

FIGURE 1 is a perspective view of a lift installation employing a pair of jacking units made in accordance with this invention. In FIGURE 1, the jacking units are partially elevated above floor level.

FIGURE 2 is a partial elevational view of the rear jacking unit of FIGURE 1 shown while it is being lowered into a floor pit.

FIGURE 3 is a front elevational view of a portion of the rear jacking unit shown engaged with the rear axle of a vehicle.

FIGURE 4 is a partial perspective view showing the rear jacking unit engaged with a rear frame portion of a vehicle behind the rear axle thereof.

FIGURE 5 is a partial side elevational view of the same rear jacking unit shown engaged with a frame portion of a vehicle forward of the rear axle thereof.

Referring to the drawings in greater detail, the lift installation illustrated in FIGURE 1 includes a front jacking unit 10 mounted in an elongate pit 12, shown located in a floor 14, and a rear jacking unit 16 located in a floor pit 18. Vehicle lift installations of the type shown in FIGURE 1 are commonly known as "movable piston lifts" since the front jacking unit 10 is mounted for movements along the length of the pit 12. For safety, a pair of slidable cover plates 20 cover the pit 12 and are connected in any suitable fashion to the jacking unit 10 for movement therewith. The rear jacking unit 16 is fixed in its pit 18.

The jacking unit 10 includes a cylinder 22 and a piston 24 vertically movable with respect to the cylinder 22. In FIGURE 1, only the uppermost portion of the cylinder 22 is visible. Mounted on top of the front piston 24, as by bolts 26, is a front superstructure including a front bolster 28 and a pair of pivotal and slidable vehicle engaging pads 30 adapted to engage portions of the front frame or front suspension of a vehicle to be lifted. The specific design of the bolster 28 and the pads 30 forms no part of this invention and a variety of conventional devices may be used for this purpose.

The rear jacking unit 16 includes a rear piston 32 mounted for vertical movement in a cylinder located within the pit 18. Mounted on top of the rear piston 32 is a rear superstructure including a rear bolster 34 upon which are slidably mounted a pair of rear vehicle engaging pad assemblies 36. As will be understood, the cylinder in which the piston 32 is movable is located in a deep central pit portion of the pit 18. The entire rear superstructure comprising the rear bolster 34 and the pad assembly 36 lowers into the pit 18 when not in use. When so lowered, the pit 18 is covered by a pair of cover plates 38 pivoted by hinges 42, on angle bars 40 which protect the upper side edges or margins of the pit 18. As best shown in FIGURE 4, the width of the bolster 34 is substantially identical to the diameter of the piston 32. When the piston 32 is in an elevated position such as shown in FIGURE 1, the cover plates 38 will rest against the piston 32. Upon lowering of the jacking unit, the cover plates 38 continue to rest upon the piston 32 and then upon the side edges of the bolster 34 and, subsequently, upon the outermost side edges of the pad assemblies 36 until the entire rear jacking unit is lowered into the pit 18. The cover plates 38 will then, by gravity, pivot into covering relation to the pit 18.

But for the construction of the bolster 34 and the pad assemblies 36, the parts of the lift assembly thus far described may be conventional. The two jacking units 10 and 16 illustrated in FIGURE 1 occupy their lowermost positions when not in use. Thus, the front jacking unit 10 will be lowered such that the bottom of the front bolster 28 is close to the floor 14 while the rear jacking unit 16 is located entirely within the pit 18. When it is desired to elevate a vehicle, the vehicle is normally driven from the right to the left as viewed in FIGURE 1 and positioned such that the appropriate lifting points at the rear of the vehicle overlie the pad assemblies 36. The front jacking unit 10 is then moved along the pit 12 and located where appropriate to engage forward portions of the underbody of the vehicle.

The pistons 24 and 32 form parts of a hydraulic or semi-hydraulic lifting mechanism, the controls for which are normally located in a control housing adjacent the elongate pit 12. A control housing cover 44 is shown in FIGURE 1 with an actuating handle 46 of a control valve (not shown) projecting therethrough. The specific type of control mechanisms are unimportant to this invention, it only being important that, upon appropriate movement of a control member such as the actuating handle 46, the pistons 24 and 32 will be elevated. Upon upward movement of the piston 32, the cover plates 38 will be pivoted upwardly and spread apart by engagement of the top portions of the pad assemblies 36. Subsequently the vehicle will be engaged and lifted by the front pads 30 and the rear pad assemblies 36. As is well known to those skilled in the art, the controls for the pistons 24 and 32 normally cause the pistons to rise simultaneously at the same rate of travel, but the rates can be changed in the event the movements of the two pistons are unequal. Of course, after the work is completed on the vehicle, it is lowered through further actuation of the actuating handle 46 and the front and rear jacking units 10 and 16 and returned to their original positions.

In the past, the rear superstructures of movable piston lifts have normally been designed to engage either the rear wheels or the rear axles of the vehicles to be lifted. In recent years, it has become a common practice to design other types of vehicle lifts to engage vehicle frame members in preference to the wheels or axles. Raising of the vehicles by frame members relaxes the vehicle suspension system and is especially useful when lubricating parts of the vehicle suspension system. In accordance with this invention, the rear jacking unit 16 is made in such a manner that it may be used either for engaging the rear axles or portions of the vehicle frame fore and aft of the rear axles.

With reference to FIGURES 1, 2 and 4, the bolster 34 comprises a flat, elongate bolster plate 50 and upwardly projecting side flanges 52 extending along the longer sides of the plate 50. Slender groove forming strips 54 are connected to the tops of the side flanges 52 and cooperate with the upper face of the bolster plate 50 to form grooves or tracks along both side margins of the bolster 34. The bolster 34 may be a formed, integral construction or can be a welded construction. Each pad assembly 36 includes a pad base plate 56 slidable on the top face of the bolster plate 50 and retained by the grooves or tracks formed by the members 50, 52 and 54. The pad body comprises a pair of vertically projecting pad side plates 58 welded to the base plate 56 and interconnected by braces 60, there being preferably one brace 60 intermediate the upper and lower ends of the pad side plates 58 and two braces 60 at the top of the side plates 58 forwardly and rearwardly thereof. Finally, each pad assembly 36 includes a vehicle engaging pad top plate 62 having a knurled, planar top surface of substantial support area and a central, laterally extending V-shaped notch or groove 64. Preferably, the pad top plates 62 are mounted on the pad body by means of laterally extending, horizontal pivot pins 66 (FIGURE 2) mounted between the pad side plates 58 in central apertures in the uppermost braces 60. To this end, as shown in FIGURE 2, the pad top plates 62 are provided with depending flanges 68 receiving the pivot pins 66. The pad top plates 62 are mounted very close to the top surface of the pad side plates 58 since only a small amount of pivotal movement of the pad top plates 62 can be tolerated. However, as will be discussed below, a small amount of pivotal movement of the pad top plates 62 is desirable.

As illustrated in FIGURE 3, the pad assemblies 36 may be slid along the bolster 34 to reach pick-up points along the rear axle housing, designated A, of a vehicle. The laterally extending grooves 64 in the pad top plates 62 are designed to provide a firm support for rounded axle housings such as the housing A. As most apparent in FIGURES 2 and 3, the pad side plates 58 project angularly upwardly from the pad base plates 56. Normally, the pad assemblies 36 will be oriented as shown in FIGURE 3 so that the pad side plates 58 diverge laterally outwardly. That is, the plates 58 appear divergent when viewed from the front or the rear of the lift installation. Therefore, the pad top plates 62 can be extended beyond the end margins of the bolster 34, thereby providing a wide reach of the pad assemblies 36. Of course, it will be appreciated that one or both of the pad assemblies 36 could occupy a position reversed from that shown in FIGURE 3 to minimize the separation between the two pad top plates 62.

When using the lift installation of FIGURE 1, the pad assemblies 36, since initially located in the pit 18, will be retracted from that position shown in FIGURE 3 so that the extreme end margins of the pad assemblies 36 reach no further than the end surfaces of the pit 18. After the vehicle to be lifted has been positioned over the lift installation and the piston 32 has begun to rise, the pad assemblies 36 are positioned, either manually or with the use of a simple positioning rod, under the desired pickup points of the vehicle.

If the piston 32 were lowered from the position shown in FIGURE 3 without movement of the pad assemblies 36 toward the center of the bolster 34, the rear jacking unit 16 could be damaged. Upon subsequent backing away of the vehicle, considerable damage could also be done to the underbody of the vehicle. Pursuant to this invention, the pad assemblies 36 are automatically moved toward the center of the bolster 34 as the rear jacking unit 16 is lowering into the pit 18. With reference to FIGURES 2 and 3, the outermost edges, designated 70, of the pad side plates 58 slope or diverge outwardly and upwardly and act as cam followers which engage the uppermost end edges of the pit 18. The slope is sufficient that, upon engaging the uppermost edges of the pit 18, the pad side plates 58 and, accordingly, the entire pad assemblies 36 are cammed inwardly, that is, are slid toward the center of the bolster 34. This sliding movement of the pad assemblies 36 begins after the plates 62 are lowered from engagement with the vehicle when the surfaces 70 strike the upper end edges of the pit 18 and continues until the piston 32 is fully lowered. When fully lowered, the pad assemblies 36 are located entirely within the pit 18. As shown best in FIGURE 2, the uppermost end edges of the pit 18 may be covered by protective angle bars 72. Accordingly, there will be relatively little wear of the edges of the pit caused by engagement of the pad assemblies 36. As known by those familiar with the art, pits such as pit 18 are often originally formed by pouring concrete around a metal box. If such construction is used, the upper edges of the metal box will take the place of the angle bars 40 and 72.

From the foregoing, it can be seen that the pad assemblies 36 can be laterally positioned where desired to provide the most satisfactory pick-up points on the rear axle of a vehicle. The axle housing A will be securely nested within the grooves 64. Because the pad top plates 62 have relatively large, knurled, planar top support surfaces, the plates 62 can also be used to engage and firmly support the frame portions or pick-up points of the vehicles to be lifted. Such use of the pad assemblies 36 is illustrated in FIGURE 4 wherein the pad top plates 62 are engaged with a portion of an automobile frame, designated F, immediately behind the rear axle A. As indicated in FIGURE 5, the pad assemblies 36 can also be used to engage frame portions in front of the rear axle.

As already mentioned, the front jacking unit 10 usually will engage beneath part of the front suspension system. Because the front suspension system is resilient, the front end of the vehicle, when elevated, will often be lower than the rearward end. If the rear pad assemblies 36 are engaged with the rear axle housing A, the tilted or sloping orientation of the vehicle presents no problem. The housing A, being rounded, merely is turned or rotated about its axis in the lateral grooves 64. Because of the novel design of the pad assemblies 36, there is also no problem if the flat top surfaces of the pad top plates 62 are engaged with the vehicle frame F, such as shown in FIGURE 4. If the front end of the vehicle is lower than the rearward end, the pad top plates 62 are merely pivoted about the pins 66. Thus, a broad or substantial area contact between the pad top plates 62 and the frame is insured. Further, there is no excessive strain on any small portion of the pad top plates 62 such as would occur if the pad top plates 62 could not pivot.

Referring again to FIGURE 3, it can be observed that the center of gravity of the pad assemblies 36 may extend beyond the ends of the bolster 34. Accordingly, the pad assemblies 36 may be tilted or cocked such that the pad base plates 56 are pivoted about their outermost bottom edges. In order to straighten out the pad assemblies 36 while the jacking unit 16 is lowering as viewed in FIGURE 2, thereby preventing binding of the pad base plates 56 within the channels formed by the members 50, 52 and 54, the slope of lower surfaces of the edges 70 is desirably less than 45° to the horizontal. Hence, the vertical component of force applied to the pad assemblies 36 is greater than the horizontal component. As the pad assemblies 36 are moved toward the center of the bolster 34, and the center of gravity lowers below the upper edge of the pit 18, such a steep slope to the edges 70 would cause the pad assemblies to cock or pivot in the opposite direction, again binding the pad base plates 56 in the bolster channels. Therefore, the slope of the edges 70 changes to one greater than 45° to the horizontal about midway between the top and bottom end of the edges 70. With a slope in excess of 45°, there is a greater horizontal component tending to slide the pad assemblies 36 along the bolster 34. As an example, pad assemblies 36 which are approximately 11 inches high having edges 70 with a lower slope of 38° and a higher slope of 57° have been successfully tested on a full hydraulic jacking unit.

Because various makes and models of vehicles are advantageously lifted on different pick-up points, a movable wheel locater plate 74 is positioned adjacent the rear jacking unit 16. The locater plate 74 is provided with depending lugs (not shown) adapted to enter apertures 76 in a wheel locating strip 78 embedded in the floor 14. The locater plate 74 has spaced, upwardly projecting, laterally extending ribs 80. If a vehicle were positioned over the installation shown in FIGURE 1 with its left rear wheel between the ribs 80, the vehicle would be lifted on its axle, as shown in FIGURE 3. When it is desired to lift the automobile in front of the rear wheel, the locater plate 74 would be positioned as shown in FIGURE 5 behind the rear jacking unit 16. Similarly, to lift upon a frame portion behind the rear axle, as illustrated in FIGURE 4, the wheel locater plate 74 would be located in front of the rear jacking unit 16. The latter position is illustrated by the phantom lines 74a in FIGURE 1.

Although the presently preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as diclosed and defined in the appended claims.

Having thus described my invention, I claim:

1. For use in a vehicle lift installation having a longitudinal axis lengthwise of vehicles to be supported thereby and lateral axes perpendicular to said longitudinal axis, a bolster having laterally extending channels along its side margins, and a pad assembly slidably mounted on said bolster, said pad assembly including a pad base plate having side edges located in said channels, a pad body mounted on said base plate, and a pad top plate pivotally mounted for pivotal rocking movement in both directions about a laterally extending axis on said pad body, said pad top plate having a planar top surface of substantial support area adapted to engage frame portions of a vehicle.

2. The apparatus of claim 1 wherein said pad top plate further has a laterally extending groove adapted to engage an axle housing of a vehicle.

3. The apparatus of claim 1 wherein said vehicle lift installation further includes a floor pit for receiving said bolster when lowered, and wherein said pad body has a sloping outermost surface which may be positioned beyond the end of said bolster, said sloping outermost surface having a sufficiently steep angle that said pad assembly is cammed inwardly along said bolster as said pad assembly is lowered into said pit.

4. Vehicle lifting apparatus including a pit; a jacking unit having a vertically movable piston within said pit, a bolster mounted on top of said piston for vertical movement therewith, a pair of vehicle engaging pad assemblies mounted for sliding movement along said bolster, said pad assemblies each having a sloping outermost edge surface which may be positioned beyond the ends of said bolster, said sloping outermost edge surface of each pad assembly having a sufficiently steep angle that said pad assemblies are cammed inwardly along said bolster as said pad assemblies are lowered into said pit.

5. Vehicle lifting apparatus including a pit; a jacking unit having a vertically movable piston within said pit, a bolster mounted on top of said piston for vertical movement therewith, a pair of vehicle engaging pad assemblies mounted for sliding movement along said bolster, said pad assemblies each having a sloping outermost edge surface which may be positioned beyond the ends of said bolster and engaging uppermost surface portions of said pit whereby both said pad assemblies are moved along said bolster as said pad assemblies are lowered into said pit, said sloping surfaces having at least two slope angles, a lower slope angle of less than 45° to the horizontal and an upper slope angle of more than 45° to the horizontal.

References Cited

UNITED STATES PATENTS

| 2,045,173 | 6/1936 | Baird | 187—8.75 |
| 2,524,237 | 10/1950 | Smith | 254—93 |
| 2,637,522 | 5/1953 | Wallace | 187—8.75 |
| 3,018,848 | 1/1962 | Ross | 187—8.52 |
| 3,106,988 | 10/1963 | Hott | 187—8.75 |
| 3,243,015 | 3/1966 | Swick | 187—8.75 |

EVON C. BLUNK, *Primary Examiner.*

H. C. HORNSBY, *Assistant Examiner.*